(12) United States Patent
Fahldieck

(10) Patent No.: US 9,137,671 B2
(45) Date of Patent: Sep. 15, 2015

(54) SYNCHRONISATION METHOD BETWEEN BASE STATIONS, RADIO COMMUNICATION SYSTEM AND BASE STATION THEREOF

(75) Inventor: Torsten Fahldieck, Ditzingen (DE)

(73) Assignee: Alcatel Lucent, Boulogne-Billancourt (FR)

( * ) Notice: Subject to any disclaimer, the term of this patent is extended or adjusted under 35 U.S.C. 154(b) by 429 days.

(21) Appl. No.: 13/127,885

(22) PCT Filed: Sep. 22, 2009

(86) PCT No.: PCT/EP2009/062247
§ 371 (c)(1),
(2), (4) Date: May 5, 2011

(87) PCT Pub. No.: WO2010/052062
PCT Pub. Date: May 14, 2010

(65) Prior Publication Data
US 2011/0222460 A1 Sep. 15, 2011

(30) Foreign Application Priority Data
Nov. 5, 2008 (EP) .................................... 08305773

(51) Int. Cl.
*H04W 16/10* (2009.01)
*H04L 5/00* (2006.01)
*H04W 24/02* (2009.01)
*H04W 72/04* (2009.01)

(52) U.S. Cl.
CPC ............. *H04W 16/10* (2013.01); *H04L 5/0023* (2013.01); *H04L 5/0035* (2013.01); *H04L 5/0037* (2013.01); *H04L 5/0092* (2013.01); *H04W 24/02* (2013.01); *H04W 72/04* (2013.01)

(58) Field of Classification Search
None
See application file for complete search history.

(56) References Cited

U.S. PATENT DOCUMENTS 6,414,947 B1 7/2002 Legg et al.
6,983,147 B1 1/2006 Hans et al.
(Continued)

FOREIGN PATENT DOCUMENTS

CN 1671224 A 9/2005
CN 101282155 A 10/2008
(Continued)

OTHER PUBLICATIONS

U.S. Appl. No. 61/046,579, filed Apr. 21, 2008.*
(Continued)

*Primary Examiner* — Robert C Scheibel
(74) *Attorney, Agent, or Firm* — Fay Sharpe LLP

(57) ABSTRACT

The invention relates to a method for use in a radio communication system (RCS), the radio communication system (RCS) comprising at least three base stations (SBS1, MBS1, MBS2), a first one (SBS1) of the at least three base stations (SBS1, MBS1, MBS2) hereinafter called first slave base station, a second one (MBS1) of the at least three base stations (MBS1, MBS2, SBS1) hereinafter called first master base station, and a third one (MBS2) of the at least three base stations (SBS1, MBS1, MBS2) hereinafter called second master base station, the method comprising the step of controlling a first part (P1) of a radio resource allocation domain at the first slave base station (SBS1) by the first master base station (MBS1), wherein the method further comprises the step of controlling at least a second part (P2) of the radio resource allocation domain at the first slave base station (SBS1) by the second master base station (MBS2), and wherein the first part (P1) and the at least second part (P2) of the radio resource allocation domain are disjoined.

17 Claims, 7 Drawing Sheets

(56) References Cited

U.S. PATENT DOCUMENTS

| | | |
|---|---|---|
| 8,089,917 B2 * | 1/2012 | Feng et al. ............... 370/315 |
| 2003/0117964 A1 | 6/2003 | Chen et al. |
| 2006/0120477 A1 | 6/2006 | Shen et al. |
| 2007/0110005 A1 | 5/2007 | Jin et al. |
| 2008/0014884 A1 | 1/2008 | Oyman et al. |
| 2009/0207761 A1 * | 8/2009 | Tangemann et al. ......... 370/281 |
| 2010/0105395 A1 * | 4/2010 | Ji et al. ............... 455/444 |
| 2010/0189038 A1 * | 7/2010 | Chen et al. ............... 370/328 |
| 2011/0002274 A1 * | 1/2011 | Grandblaise et al. ......... 370/329 |
| 2011/0038284 A1 * | 2/2011 | Senarath et al. ............. 370/279 |
| 2011/0053598 A1 * | 3/2011 | Ahluwalia ............... 455/436 |
| 2013/0010604 A1 * | 1/2013 | Zhang et al. ............. 370/241 |

FOREIGN PATENT DOCUMENTS

| | | | | |
|---|---|---|---|---|
| EP | 2 106 036 A1 | 9/2009 | | |
| JP | 2003-199144 | 7/2003 | | |
| JP | 2007-135206 | 5/2007 | | |
| JP | 2008-523665 | 7/2008 | | |
| WO | WO 2008/110092 | * 9/2008 | ............... H04J 3/00 |
| WO | WO 2008/155764 A | 12/2008 | | |

OTHER PUBLICATIONS

Hedayat A. et al., "Cooperative Communication in Wireless Networks," IEEE Communications Magazine, IEEE Service Center, Piscataway, US, vol. 42, No. 10, XP011120045, pp. 74-80, Oct. 1, 2004.

International Search Report for PCT/EP2009/062247 dated Jan. 22, 2010.

Part 16: Air Interface for Fixed and Mobile Broadband Wireless Access Systems; Amendment 2: Physical and Medium Access Control Layers for Combined Fixed and Mobile Operation in Licensed Bands and Corrigendum 1; IEEE Std 8702.16e™-2005 and IEEE Std 802.16™-2004/Cor1-2005, New York, New York, Feb. 28, 2006, pp. 1-864.

* cited by examiner

SYNCHRONISATION METHOD BETWEEN BASE STATIONS, RADIO COMMUNICATION SYSTEM AND BASE STATION THEREOF

The invention is based on a priority application EP 08 305 773.7 which is hereby incorporated by reference.

TECHNICAL FIELD

The invention relates to a method for use in a radio communication system, said radio communication system comprising at least three base stations, a first one of said at least three base stations hereinafter called first slave base station, a second one of said at least three base stations hereinafter called first master base station, and a third one of said at least three base stations hereinafter called second master base station, said method comprising the step of controlling a first part of a radio resource allocation domain at said first slave base station by said first master base station, to a radio communication system comprising at least three base stations, a first one of said at least three base stations hereinafter called first slave base station, a second one of said at least three base stations hereinafter called first master base station, and a third one of said at least three base stations hereinafter called second master base station, said radio communication system comprising means for controlling a first part of a radio resource allocation domain at said first slave base station by said first master base station, and to a base station, said base station comprising means for controlling a first part of a radio resource allocation domain.

BACKGROUND OF THE INVENTION

In radio communication standards as for example in IEEE 802.16e, two or more base stations are synchronized to a same time basis. The base stations transmit synchronized downlink frames to mobile stations located in the coverage area of the base stations. In an overlap area belonging to two or more base stations the synchronized downlink frames of neighbour base stations can comprise resource blocks, which comprise the same data for a specific mobile station.

In collaborative MIMO (MIMO=multiple input multiple output) with multiple antennas at the transmitter and the receiver, two or more base stations collaborate in the downlink direction to send simultaneously radio signals in a same frequency band to a mobile station. In that way, the data throughput of the individual transmitters CaO be incremented, even if each base station has only a single antenna.

In a method for data synchronisation especially for collaborative MIMO an OFDMA radio communication system (OFDMA=orthogonal frequency division multiple access) comprises a network element coupled to at least a first and a second base station. The first base station is a master base station and the second base station is a slave base station of the master base station. The master base station and the slave base station are coupled to at least one wireless terminal. The relevant steps according to this method are: receiving a collaborative MIMO connection request from the wireless terminal by the master base station or the slave base station, sending a duplication signal to the network element from the master base station or the slave base station, the duplication signal indicating a duplication of a collaborative IP flow (IP=Internet Protocol) for the wireless terminal, receiving a first IP packet of the collaborative IP flow by the master base station and scheduling a first portion of a first downlink frame, sending a frame layout message from the master base station to the slave base station, the frame layout message containing a description about the first portion of the first downlink frame, and scheduling a second portion of a second downlink frame by the slave base station with the description of the first portion of the first downlink frame.

The way of scheduling data to a downlink frame by a base station affects the overall data rate of the base station. Therefore, it is the object of the invention to improve the data throughput of base stations using such portions hereinafter called parts in the downlink frame.

SUMMARY OF THE INVENTION

This object is achieved by a method for use in a radio communication system, the radio communication system comprising at least three base stations, a first one of the at least three base stations hereinafter called first slave base station, a second one of the at least three base stations hereinafter called first master base station, and a third one of the at least three base stations hereinafter called second master base station, the method comprising the step of controlling a first part of a radio resource allocation domain at the first slave base station by the first master base station, wherein the method further comprises the step of controlling at least a second part of the radio resource allocation domain at the first slave base station by the second master base station, and wherein the first part and the at least second part of the radio resource allocation domain are disjoined.

The object is further achieved by a radio communication system comprising at least three base stations, a first one of said at least three base stations hereinafter called first slave base station, a second one of said at least three base stations hereinafter called first master base station, and a third one of said at least three base stations hereinafter called second master base station, said radio communication system comprising means for controlling a first part of a radio resource allocation domain at said first slave base station by said first master base station, whereby said radio communication system further comprises means for controlling at least a second part of said radio resource allocation domain at said first slave base station by said second master base station, and wherein said first part and said at least second part of said radio resource allocation domain are disjoined and by a base station, said base station comprising means for controlling a first part of a radio resource allocation domain, wherein said base station further comprises: means for receiving a request for coordinating said first part and at least a second part of said radio resource allocation domain, means for processing said request according to a requirement that said first part and said at least second part of said radio resource allocation domain are disjoined and means for transmitting a result of said processing.

Depending on the allocation of slave and master functions to the base stations of a radio access network, a slave base station can be located in a neighbourhood of more than one master base station.

Furthermore, a master base station can be responsible for a larger group of base stations hereinafter called domain. Slave base stations at the border of such a domain can be assigned also to an adjacent domain. Those slave base stations will be controlled by more than one master base station.

The method according to the present invention offers the benefit to avoid a situation in the slave base station, that two master base stations want to control the same part or an overlapping part of the radio resource allocation domain at the slave base station.

Another advantage is the avoidance of signaling messages from the slave base station back to the master base stations in case of a double allocation of resources at the slave base station.

A further advantage is that a mobile station can receive data units of separate data flows belonging to different collaborative MIMO domains in one downlink frame.

Parameters of the first and second part, e.g. the size, the form, or the location within the radio resource allocation domain, can be determined by an OMC (OMC=operation and maintenance centre), they can be coordinated directly between the involved master base stations or other mechanisms like for example based on self-configuration can be used.

By using messages carrying the frame layouts for the first and second part only a one-way signalling message from the master base station to the slave base station is required. Sending the message carrying the frame layout furthermore in a multicast transmission to several base stations signalling resources can be further reduced.

The invention can be also used to trigger a precise point in time, when a hard handover from a master base station to a slave base station or in backward direction should be performed without a delay in the packet transfer.

Further advantageous features of the invention are defined by dependent claims for the method.

BRIEF DESCRIPTION OF THE DRAWINGS

The embodiments of the invention will become apparent in the following detailed description and will be illustrated by accompanying drawings given by way of non-limiting illustrations.

FIG. 5 shows a flow diagram of a first application of the invent on.

DETAILED DESCRIPTION OF PREFERRED EMBODIMENTS

Figure 1:
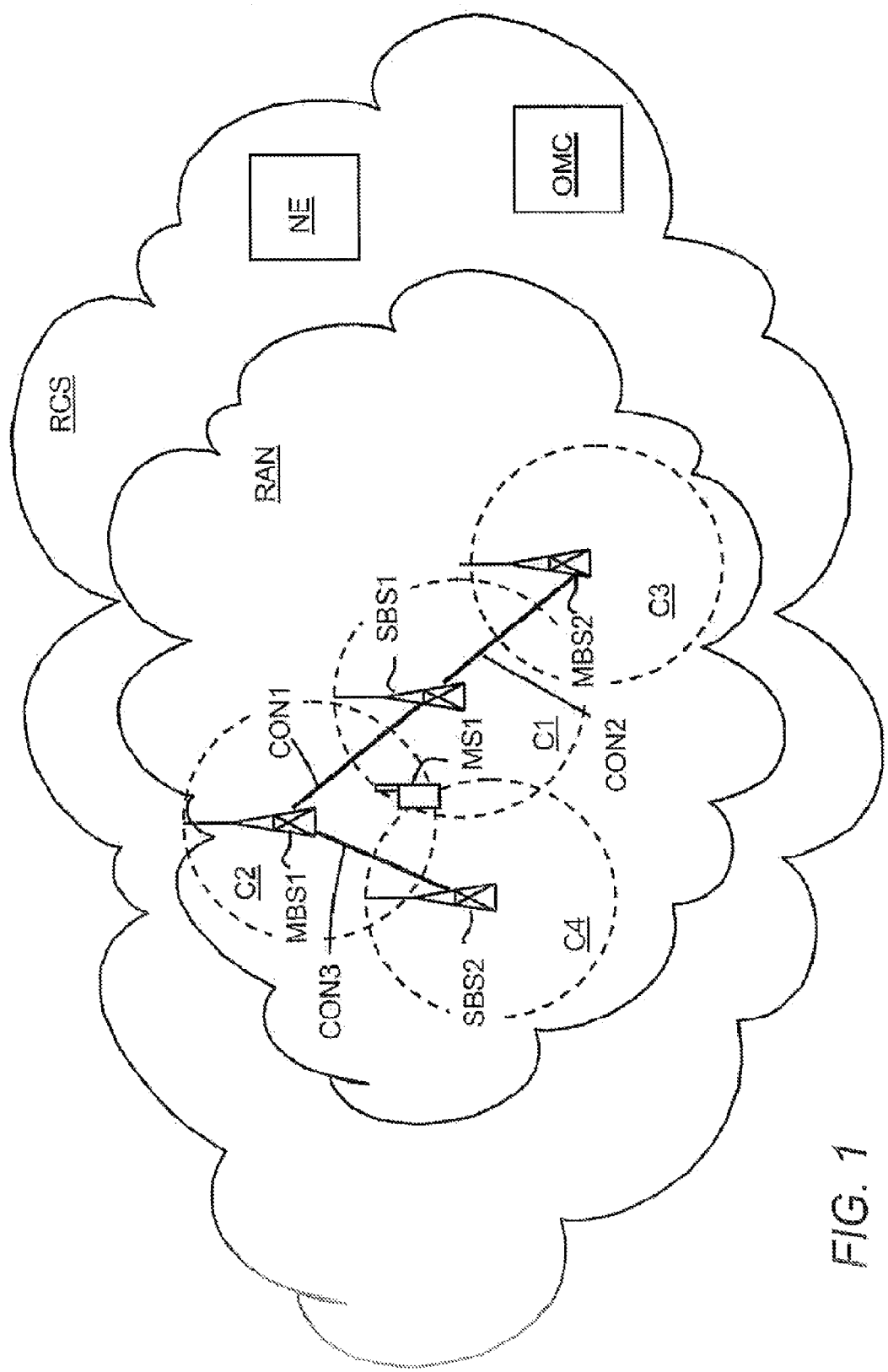
FIG. 1 shows a block diagram of a radio communication network for performing a method in accordance to a first and a second embodiment of the invention.

Referring to FIG. 1 a radio communication system RCS contains a radio access network RAN, a network element NE, and an operation and maintenance centre OMC.

The radio access network RAN contains a first master base station MBS1, a second master base station MBS2, a first slave base station SBS1, a second slave base station SBS2, and a first mobile station MS1. Further master base stations, slave base stations and mobile stations of the radio access network RAN are not shown for simplification.

The first slave base station SBS1 provides radio access for a first radio cell C1. The first master base station MBS1 provides radio access for a second radio cell C2. The second master base station MBS2 provides radio access for a third radio cell C3. The second slave base station SBS2 provides radio access for a fourth radio cell C4.

The first radio cell C1 adjoins or overlaps the second radio cell C2 and the third radio cell C3. The fourth radio cell C4 adjoins or overlaps the second radio cell C2 and the first radio cell C1.

The first master base station MBS1 is connected to the first slave base station SBS1 via a first connection CON1. The second master base station MBS2 is connected to the first slave base station SBS1 via a second connection CON2. The first master base station MBS1 is connected to the second slave base station SBS2 via a third connection CON3.

The connections CON1, CON2, and CON3 between the base stations MBS1, MBS2, SBS1, and SBS2 can be based on any common transmission technique by using for example wire based, fibre based, or radio based links. By using wire based or fibre based links, no wireless resources are wasted for signaling between the base stations MBS1, MBS2, SBS1, and SBS2.

The first mobile station MS1 is located in the overlap area of the first radio cell C1, the second radio cell C2, and the fourth radio cell C4 and is therefore able to receive data from the first master base station MBS1, the first slave base station SBS1, and the second slave base station SBS2.

As in a common radio communication system each base station MBS1, MBS2, SBS1, and SBS2 can be connected to the operation and maintenance centre OMC to be able to adjust parameters or functions of the base stations via remote control.

Furthermore, the base stations MBS1, MBS2, SBS1, and SBS2 of the radio access network RAN can be connected as in a common radio communication system to the network element NE. The network element NE can be for example a data gateway through which all user data packets coming from the radio access network RAN or going to the radio access network RAN will be transferred.

The first master base station MBS1 and the second master base station MBS2 are master base stations of the first slave base station SBS1. Both master base stations MBS1 and MBS2 control resources of a radio resource allocation domain at the first slave base station SBS1. In addition the first master base station MBS1 is a master base station of the second slave base station SBS2 and controls resources of its radio resource allocation domain.

Figure 2:
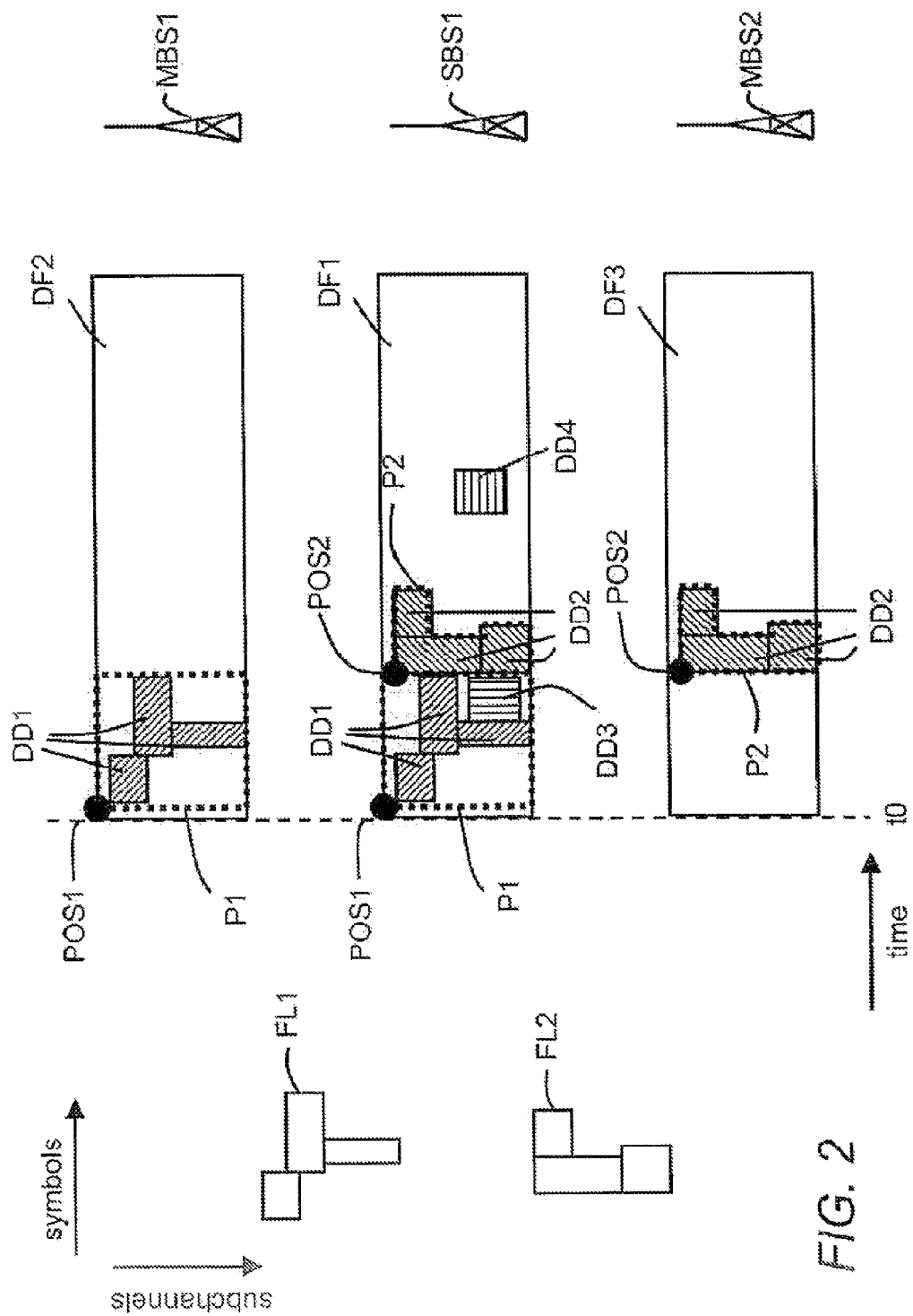
FIG. 2 shows a block diagram of downlink frames for performing the method in accordance to the first and the second embodiment of the invention.

FIG. 2 shows schematically radio resource allocation domains of a first downlink frame DF1, a second downlink frame DF2, and a third downlink frame DF3 according to the present invention.

Exemplarily a frame structure of an OFDMA radio communication system has been chosen, wherein the abscissa (x-coordinate) represents the sequence of symbols in time and the ordinate (y-coordinate) represents the sequence of symbols in subchannels (in frequency) within each downlink frame DF1, DF2, and DF3.

Alternatively frame structures of other radio communication systems like e.g. TDMA can be used.

The first downlink frame DF1 belonging to the first slave base station SBS1, the second downlink frame DF2 belonging to the first master base station MBS1, and the third downlink frame DF3 belonging to the second master base station MBS2 have a same position according the ordinate. The same position according the ordinate means that the downlink frames DF1. DF2, and DF3 are transmitted with the same subchannels in the same frequency band.

The downlink frames DF1. DF2, and DF3 have also a same position tO according the ordinate. This means that the downlink frames DF1. DF2, and DF3 are synchronised to each other. The synchronisation can be for example realised by transmitting the downlink frames DF1. DF2, and DF3 at the same point in time to the first mobile station MS1. Slightly different transmit times from the base stations MBS1, SBS1, and MBS2 to the first mobile station MS1 can be compensated in the first mobile station MS1 by short-time buffering of faster downlink frames within the first mobile station MS1 to get synchronised downlink frames for the further data processing within the first mobile station MS1.

The first downlink frame DF1 comprises a radio resource allocation domain with a first part P1 having a first position POS1 according to the abszissa and the ordinate and with a second part P2 having a second position POS2 according to the abszissa and the ordinate. The first part P1 and the second part P2 of the first downlink frame DF1 are disjoined.

The first and second part P1 and P2 can be described by parameters such as position, size and form inside the first downlink frame DF1. Other parameters are possible. The size specifies the total number of resources allocated to the parts P1 and P2 and the form specifies, which symbols and subchannels of the first downlink frame DF1 are allocated to the parts P1 and P2.

The second downlink frame DF2 comprises the first part P1 with the first position POS1 according to the abszissa and the ordinate.

The third downlink frame DF3 comprises the second part P2 with the second position POS2 according to the abszissa and the ordinate.

The first master base station MBS1 controls the first part P1 and the second master base station MBS2 controls the second part P2 of the radio resource allocation domain at the first slave base station SBS1. The controlling is performed in such a way, that the first part P1 and the second part P2 of the radio resource allocation domain are disjoined.

The advantage of disjoined parts P1 and P2 is the avoidance of conflicts at the first slave base station SBS1 in cases, where both master base stations MBS1 and MBS2 allocate same resources of the radio resource allocation domain. Such conflicts would decrease the total data rate at the first slave base station SBS1. Furthermore, the avoidance of conflict situations also avoids signalling messages to overcome the conflicts.

The first part P1 of the first downlink frame DF1 can comprise first downlink data DD1 according to a first frame layout FL1 and the second part P2 of the first downlink frame DF1 can comprise second downlink data DD2 according to a second frame layout FL2.

The first and second frame layout FL1 and FL2 comprise several or all of the following parameters: identification of the downlink frame or the downlink frames that the master base station is scheduling according to the invention; position, size, form, and coding scheme used for the parts P1 and P2 inside the first downlink frame DF1; information of every MAC PDU (MAC=media access control, PDU=protocol data unit) inside the parts P1 and P2. The information of every MAC PDU can include—but is not limited to—the number of bytes, length, connection identifier, position and reference number of the corresponding access network packet.

It is not required, that both parts P1 and P2 are filled with first and second downlink data DD1 and DD2 in every downlink frame DF1. DF2, and DF3.

The first or second frame layout FL1 and FL2 can cover all resources of the first or second part P1 and P2 or only a portion of the resources. Exemplarily, in FIG. 2 the first frame layout FL1 comprises not all resources of the first part P1 whereas the second frame layout FL2 comprises all resources of the second part P2. The allocation of symbols and subchannels to the frame layouts FL1 and FL2 can be chosen arbitrarily by the master base stations.

The first downlink frame DF1 can further comprise third downlink data DD3 inside the first part P1 but outside the first frame layout FL1 or inside the second part P2 but outside the second frame layout FL2. Radio resources inside the parts P1. P2 but outside the frame layouts FL1. FL2 are controlled by the first slave base station SBS1.

By filling the third downlink data DD3 into the first or second part P1 and P2 radio resources of the first and second part P1 and P2 not used for the first or second frame layout FL1 and FL2 are not wasted, which increases the total data rate of the first slave base station SBS1.

The first downlink frame DF1 can further comprise fourth downlink data DD4 outside the first part P1 and outside the second part P2. Radio resources outside the parts P1 and P2 are controlled by the first slave base station SBS1.

By filling the fourth downlink data DD4 to regions of the first downlink frame DF1 not used by the first or second part P1 and P2 radio resources of the first downlink frame DF1 not used for the first or second frame layout FL1 and FL2 are not wasted, which can further increase the total data rate of the first slave base station SBS1.

Figure 3:
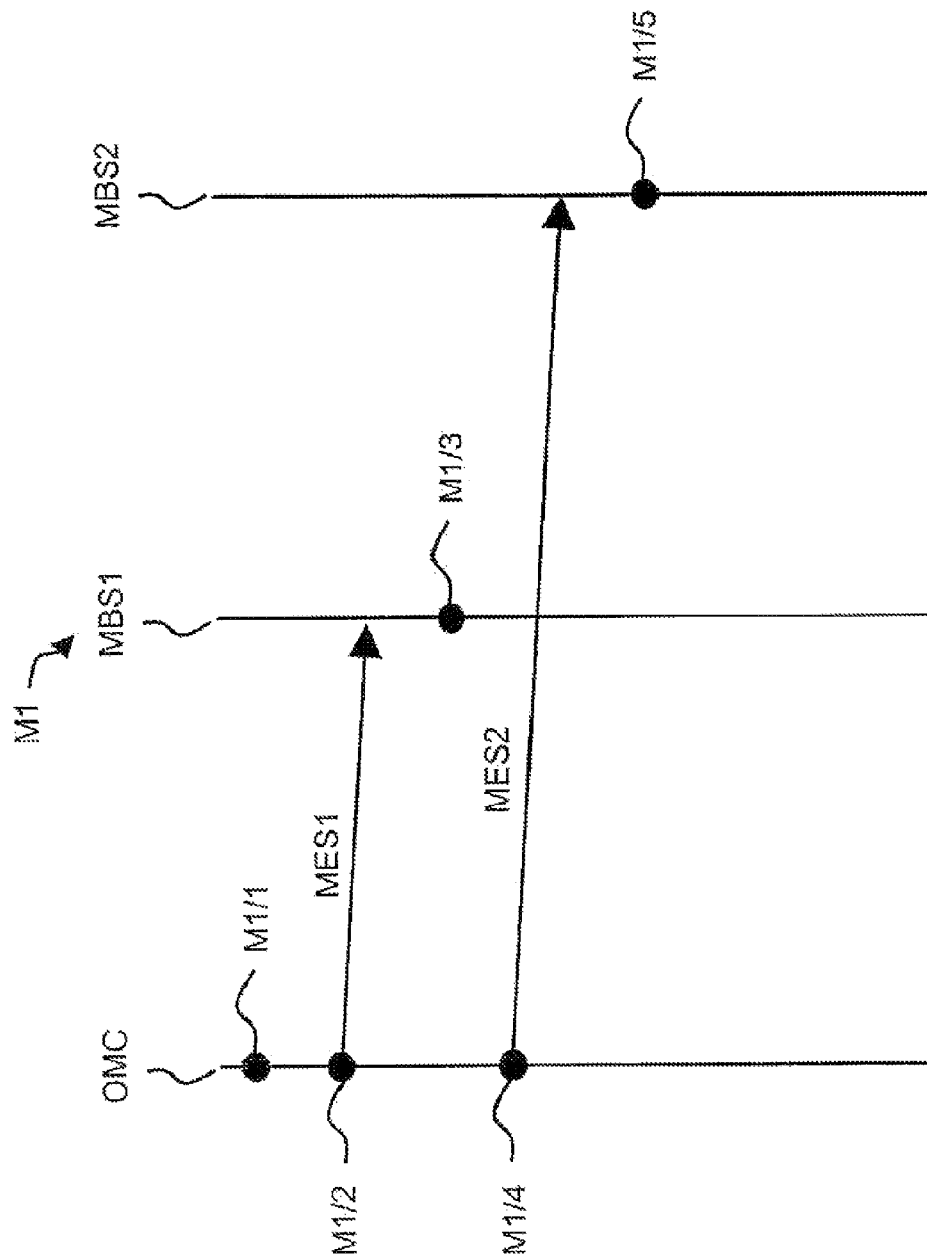
FIG. 3 shows a flow diagram of the method in accordance to the first embodiment of the invention.

Referring to FIG. 3 a flow diagram of a method M1 in accordance to a first embodiment of the invention is shown.

In a first step M1/1 the operation and maintenance centre OMC changes the partitioning of the radio resource allocation domain according to the parts P1 and P2 controlled by the master base stations MBS1 and MBS2. Instead of the operation and maintenance centre OMC also other network elements in the radio communication system RCS with control functions like for example an SGSN (Serving GPRS Support Node) or an MSC (Mobile Switching Center) in UMTS can be used for the partitioning change of the parts P1 and P2.

The change can be performed by determining new parameters like for example new positions, new sizes and/or new forms of the parts P1 and P2. The allocation of symbols and subchannels to the parts P1 and P2 can be chosen arbitrarily by the operation and maintenance centre OMC with the requirement that the parts P1 and P2 must be disjoined within the radio resource allocation domain of the downlink frames DF1, DF2, and DF3.

In a next step M1/2 the operation and maintenance centre OMC transmits the new parameters of the first part P1 in a first message MES1 to the first master base station MBS1.

In a further step M1/3 the first master base station MBS1 adjusts the first part P1 according to the new parameters received within the first message MES1 and controls in that way the first part P1 of the radio resource allocation domain for all slave base stations assigned to the first master base station MBS1.

In a next step M1/4 the operation and maintenance centre OMC transmits the new parameters of the second part P2 in a second message MES2 to the second master base station MBS2.

In a further step M1/5 the second master base station MBS2 adjusts the second part P2 according to the new parameters received within the second message MES2 and controls in that way the second part P2 of the radio resource allocation domain for all slave base stations assigned to the second master base station MBS2.

The sequence and the number of the steps for performing the method M1 is not critical, and as can be understood by those skilled in the art, that the sequence and the number of the steps may vary without departing from the scope of the invention.

The advantage of the determination of the parameters of the first part P1 and the second part P2 by the operation and maintenance centre OMC at predefined time intervals is the possibility to adapt the first part P1 and the second part P2 to the amount of the data traffic transmitted via the first master base station MBS1 and the second master base station MBS2 for a longer time scale, e.g. for a large number of downlink frames.

The determination of the parameters of the first part P1 and the second part P2 can be also done by other network procedures not using additional supervising network elements like the operation and maintenance centre OMC. Another possibility is for example the change of the parameters by the master base stations MBS1 and MBS2 itself.

Figure 4:
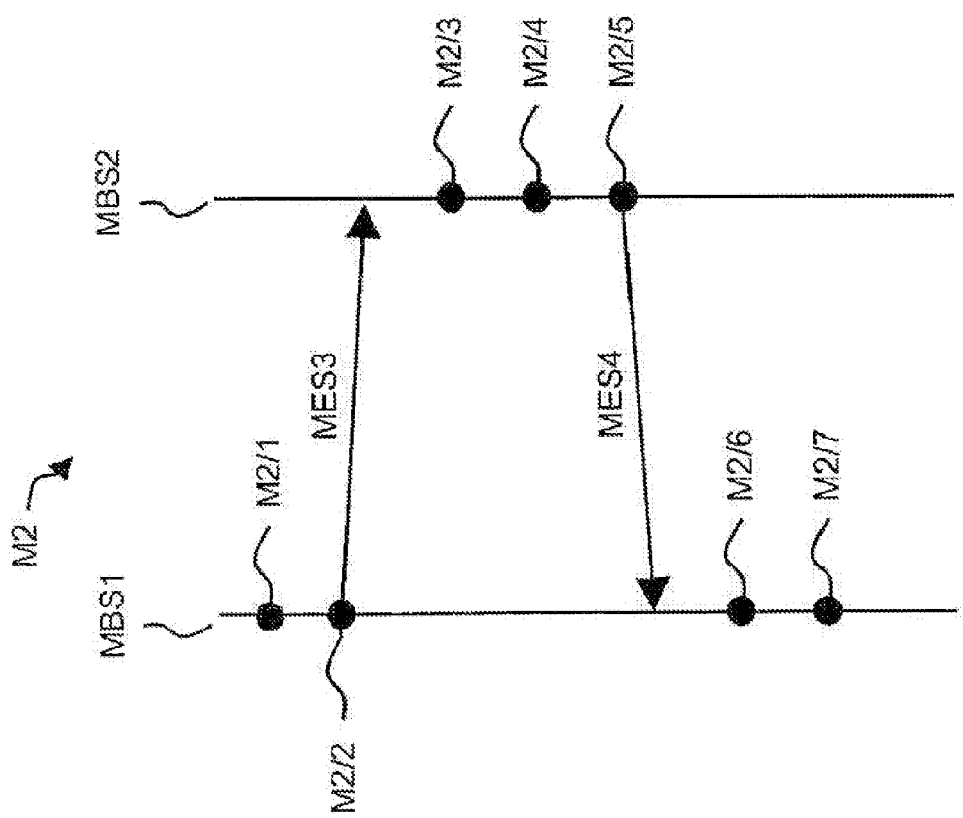
FIG. 4 shows a flow diagram of the method in accordance to the second embodiment of the invention.

Referring to FIG. 4 a flow diagram of a method M2 in accordance to a second embodiment of the invention is shown.

In a first step M2/1 the first master base station MBS1 wants to change the first part P1 of the radio resource allocation domain and determines new parameters of the first part P1. The reason for the change can be a change in the data traffic via the first master base station MBS1 within a short time frame.

In a next step M2/2 the first master base station MBS1 transmits a request within a third message MES3 to the second master base station MBS2 to coordinate the change of the first part P1.

In a further step M2/3 the second master base station MBS2 verifies, if the first part P1, described by the new parameters do not overlap and is disjoined with the second part P2 currently controlled by the second master base station MBS2.

In a next step M2/4 the second master base station MBS2 can accept the new first part P1, it can change the new parameters of the first part P1, or it can change the parameters of the second part P2 according to the new first part P1 with the requirement that the first part P1 and the second part P2 must be disjoined.

In a further step M2/5 the second master base station MBS2 transmits an answer within a fourth message MES4 to the first master base station MBS1. The answer can contain for example an acknowledgement for the new first part P1 or new parameters of the first part P1 determined by the second master base station MBS2.

In a next step M2/6 the first master base station MBS1 verifies the answer of the second master base station MBS2.

Depending on the result of the verification, in a further step M2/7 the first master base station MBS1 controls the first part P1 as requested, it controls the first part P1 as changed by the second master base stations MBS2 or it can send a new request to the second master base station MBS2.

It is self-evident that the method M2 can also start and end at the second master base station MBS2. Furthermore, the sequence and the number of the steps for performing the method M2 is not critical, and as can be understood by those skilled in the art, that the sequence and the number of the steps may vary without departing from the scope of the invention.

The advantage of the determination of parameters of the first part P1 and the second part P2 by the master base stations MBS1, MBS2 itself at predefined time intervals is the possibility to adapt the first part P1 and the second part P2 to the amount of the current data traffic transmitted via the first master base station MBS1 and the second master base station MBS2 for a shorter time scale, e.g. for only a small number of downlink frames.

It is also possible that the parameters of the first part P1 and the second part P2 can be determined by self-configuration and self-optimisation mechanisms performed at the master base stations MBS1 and MBS2. In that way the parts P1 and P2 can be changed without the use of any signaling messages.

The basic idea of the invention with at least two controlled and disjoint parts P1 and P2 can be used for different application scenarios. Some of the applications are described in more detail in the following.

Figure 5:
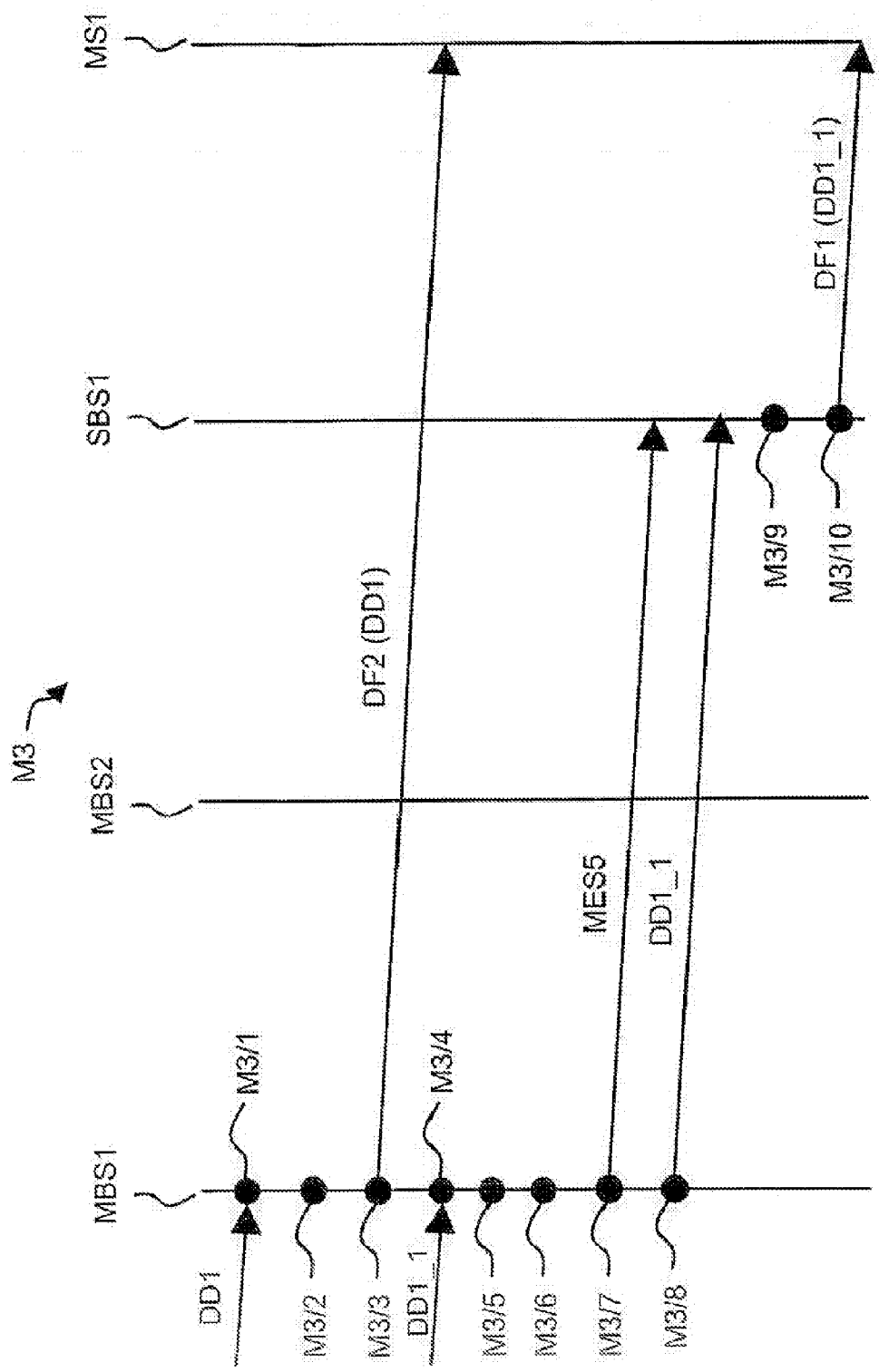

Referring to FIG. 5 a flow diagram of a method M3 in accordance to a first application of the invention is shown.

In a first step M3/1 the first master base station MBS1 receives first downlink data DD1 via a backbone of the radio communication system RCS.

In a further step M3/2 the first master base station MBS1 schedules the first downlink data DD1 to the first part P1 of the second downlink frame DF2.

In a next step M3/3 the first master base station MBS1 transmits the second downlink frame DF2 with the first downlink data DD1 to the first mobile station MS1.

In a next step M3/4 the first master base station MBS1 receives additional first downlink data DD1_1 via the backbone of the radio communication system RCS.

In a further step M3/5 the first master base station MBS1 starts a handover for the first mobile station MS1. A handover is usually executed if a mobile station is at the border of a radio cell and a neighbour base station is more suitable to exchange user data with the mobile station.

In a next step M3/6 the first master base station MBS1 determines the first frame layout FL1 for the additional first downlink data DD1_1 mapping into the first part P1 of the radio resource allocation domain.

In a further step M3/7 the first master base station MBS1 transmits the first frame layout FL1 in a fifth message MES5 to the first slave base station SBS1.

In a next step M3/8 the first master base station MBS1 forwards the additional first downlink data DD1_1 to the first slave base station SBS1.

In a further step M3/9 the first slave base station SBS1 schedules the additional first downlink data DD1_1 to the first part P1 of the first downlink frame DF1 according to the first frame layout FL1.

In a next step M3/10 the first slave base station SBS1 transmits the first downlink frame DF1 with the additional first downlink data DD1_1 to the first mobile station MS1.

The sequence and the number of the steps for performing the method M3 is not critical, and as can be understood by those skilled in the art, that the sequence and the number of the steps may vary without departing from the scope of the invention.

The method M3 can be used for a hard handover from the first master base station MBS1 to the first slave base station SBS1, if the first mobile station MS1 moves within the radio access network RAN. A hard handover is a process, wherein the first mobile station MS1 uses at a first time before the hard handover only a radio link to the first master base station MBS1 to receive or transmit user data. At a second time during the hard handover the first mobile station MS1 release the radio link to the first master base station MBS1 and then builds up a new radio link to the first slave base station SBS1 to further on receive or transmit user data.

The main advantage of the method M3 is the possibility to control the point in time by the first master base station MBS1, when the first slave base station SBS1 starts transmission of the additional first downlink data DD1_1 to the first mobile station MS1. In that way, the transmission break for the user data can be minimised and especially real-time services will not suffer a large interruption of the packet sequence.

In case of a handover procedure in an overlap area between two radio cells it is also possible to bicast a downlink dataflow via two base stations to a mobile station. In that case, the radio link between the first master base station MBS1 and the first mobile station MS1 is not released until the handover is finished. This is similar to the soft handover procedure used in UMTS (UMTS=universal mobile telecommunication system) with same downlink dataflows spread over different base stations by macro diversity.

The method M3 can be extended by transmitting the first frame layout FL1 and the additional first downlink data DD1_1 via multicast from the first master base station MBS1 to the first slave base station SBS1 and the second slave base station SBS2 if it cannot be foreseen to which slave base station the first mobile station MS1 will move. In that way, a longer transmission break for the user data can be avoided.

Figure 6:
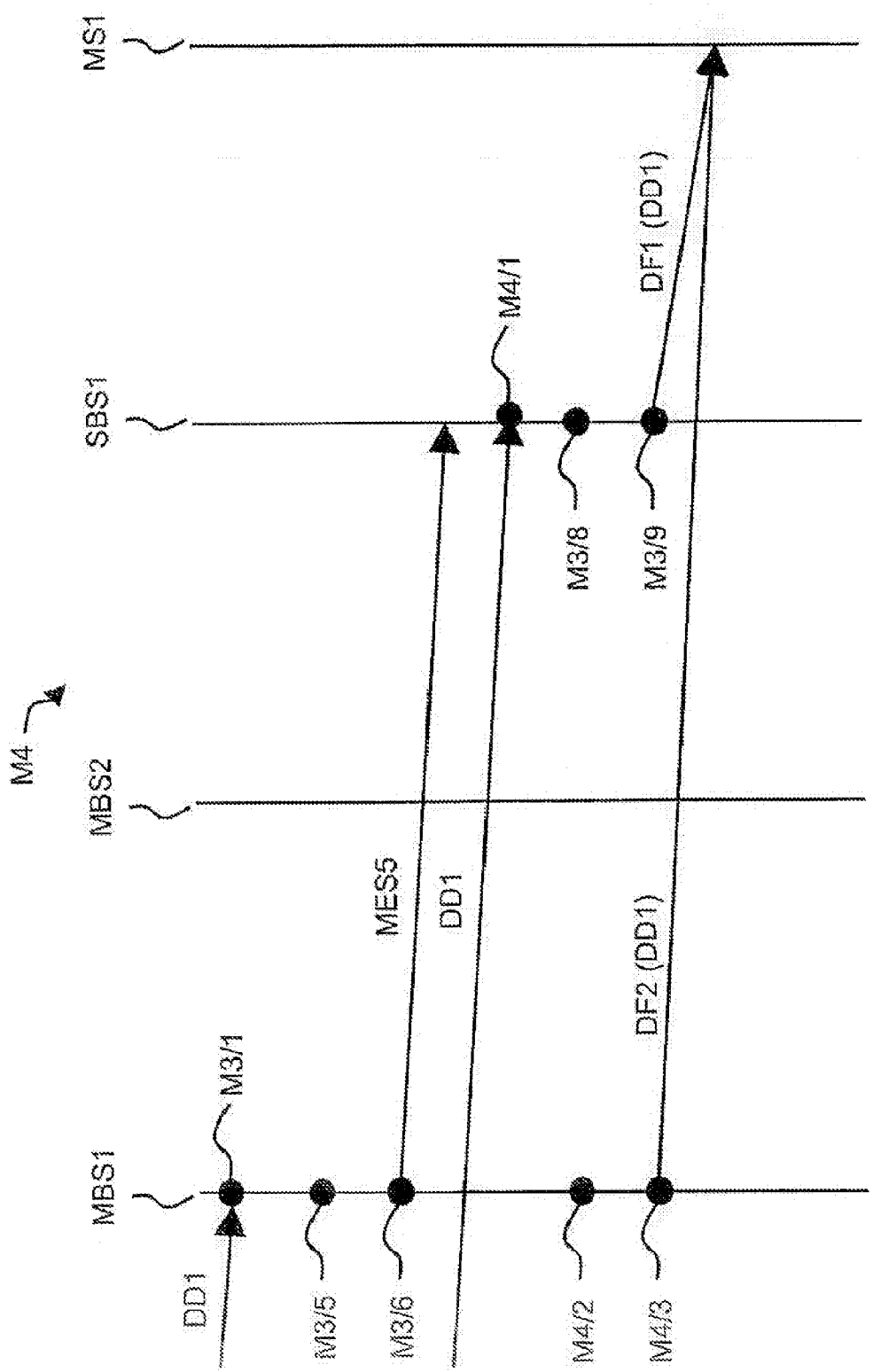
FIG. 6 shows a flow diagram of a further application of the invention.

Referring to FIG. 6 a flow diagram of a method M4 in accordance to a further application of the invention is shown. In addition to the steps M3/1, M3/6, M3/7, M3/9, and M3/10 performed in the first application of the invention, in the further application of the invention following step M4/1 is performed prior to the step M3/8, step M4/2 is performed after the step M3/6 and step M4/3 is performed at the same time as the step M3/9.

In comparison to the method M3, in the method M4 the first slave base station SBS1 does not receive the first downlink data DD1 via the first master base station MBS1 but it receives in a further step M4/1 a copy of the first downlink data DD1 from the network element NE.

In a next step M4/2 the first master base station MBS1 schedules the first downlink data DD1 to the first part P1 of the second downlink frame DF2 according to the first frame layout FL1. In that way, the first part P1 is located in identical regions of the first downlink frame DF1 and the second downlink frame DF2.

In a further step M4/3 the first master base station MBS1 transmits the second downlink frame DF2 to the first mobile station MS1 synchronized with the first downlink frame DF1, which is transmitted by the first slave base station SBS1 at a first predefined time.

The sequence and the number of the steps for performing the method M4 is not critical, and as can be understood by those skilled in the art, that the sequence and the number of the steps may vary without departing from the scope of the invention.

By using such a multicast transmission from the first master base station MBS1 and the first slave base station SBS1 to the first mobile station MS1 the first mobile station MS1 will receive the first downlink data DD1 with fewer transmission errors in comparison to the use of a single radio link from one base station to the mobile station. In case of the multicast transmission with transmission paths which are different in the space, the overall data rate of the transmission to the first mobile station MS1 is less sensitive to single fading or shadowing effects in comparison to the case of a single radio link with a higher probability for transmission errors caused by fading or shadowing effects. Therefore the multicast transmission can increase the overall data rate from the radio access network RAN to the first mobile station MS1.

Currently, OFDMA transmission technique is often combined with MIMO transmission technique or MISO transmission technique (MISO=multiple input single output) to increase the throughput of radio communication systems without the use of additional frequency spectrum. In addition a multiple antenna system can be spread over several base stations for a collaborative MIMO or MISO transmission scheme.

Therefore, in an alternative application of the invention, both the first downlink frame DF1 and the second downlink frame DF2 are transmitted in a collaborative MIMO mode or in a collaborative MISO mode to the first mobile station MS1. By using the invention in combination with collaborative MIMO the transmission efficiency of a MIMO channel can be further improved.

In a specific collaborative MIMO domain, which is controlled by a specific master base station, user data or signaling data can be distributed to all mobile stations located in the specific collaborative MIMO domain. In such a case the specific master base station can transmit in a further alternative application of the invention the frame layout in a multicast way to all slave base stations belonging to the specific collaborative MIMO domain.

The advantage of such a multicast transmission is the saving of resources e.g. on the connections CON1 and CON3 from the first master base station MBS1 to the first and second slave base station SBS1 and SBS2. Otherwise, two signaling messages with identical payload must be sent from the first master base station MBS1 to the first and second slave base station SBS1 and SBS2.

Depended on the arrangement of radio cells within a radio access network and depended of the allocation of master and slave functions to the base stations of the radio access network according to the invention a mobile station can be located within the overlap area of a slave base station and two master base stations. In such a constellation, the invention can be used to send the first downlink frame DF1 with the first downlink data DD1 and the second downlink data DD2 from the first slave base station SBS1, the second downlink frame DF2 with the first downlink data DD1 from the first master base station MBS1, and the third downlink frame DF3 with the second downlink data DD2 from the second master base station MBS2 synchronized at a second predefined time to the first mobile station MS1.

This procedure provides the advantage, that the first mobile station MS1 is able to receive the first downlink data DD1 and the second downlink data DD2 for two adjacent collaborative MIMO domains by a single downlink frame DF1 simultaneously without a data conflict and can also receive the first downlink data DD1 in the second downlink frame DF2 and the second downlink data DD2 in the third downlink frame DF3 at the same time to improve the data constancy.

Figure 7:
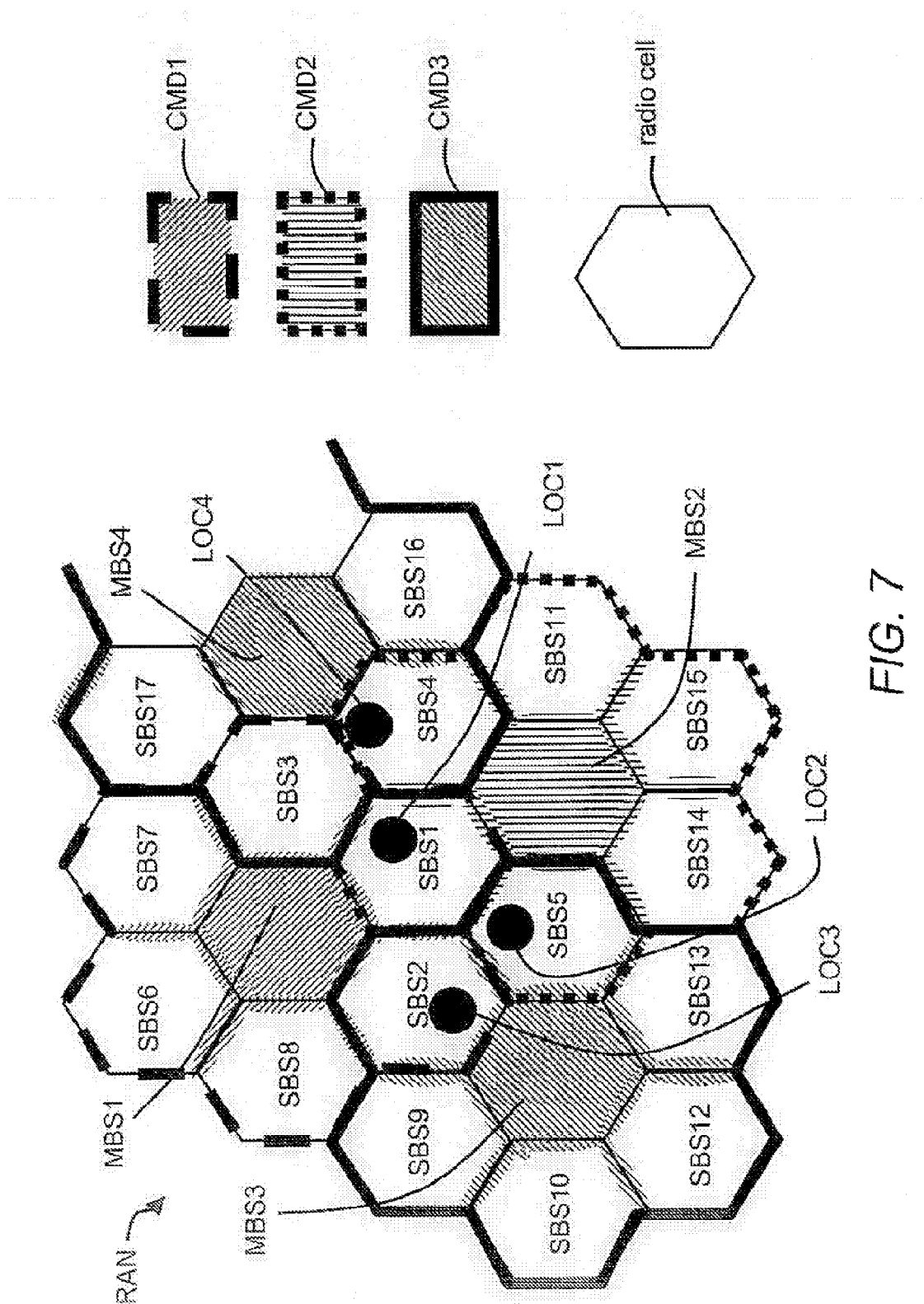
FIG. 7 shows a block diagram of radio cells in accordance to a fifth embodiment of the invention.

Referring to FIG. 7 an example for the arrangement of radio cells of the radio access network RAN and the allocation of master and slave functions is shown for the special case of a hexagonal radio cell grid. The basic structure of the arrangement and allocation of master and slave functions is that the radio cells of the first and second master base station MBS1 and MBS2 and a radio cell of a third master base station MBS3 is surrounded by up to six radio cells belonging to different slave base stations. In particular at the border of the radio access network RAN a master base station can be surrounded by less than six neighbor slave base stations.

A first group of base stations of a first collaborative MIMO domain CMD1 comprises following base stations: the first master base station MBS1, the first slave base station SBS1, the second slave base station SBS2, an eighth slave base station SBS8, a sixth slave base station SBS6, a seventh slave base station SBS7, and a third slave base station SBS3.

A second group of base stations of a second collaborative MIMO domain CMD2 comprises following base stations: the second master base station MBS2, the first slave base station SBS1, a fourth slave base station SBS4, an eleventh slave base station SBS11, a fifteenth slave base station SBS15, a fourteenth slave base station SBS14, and a fifth slave base station SBS5.

A third group of base stations of a third collaborative MIMO domain CMD3 comprises following base stations: the third master base station MBS3, the second slave base station SBS2, the fifth slave base station SBS5, a thirteenth slave base station SBS13, a twelfth slave base station SBS12, a tenth slave base station SBS10, and a ninth slave base station SBS9.

Each radio cell of each slave base station is surrounded by up to four radio cells belonging other slave base stations and up to two radio cells belonging to master base stations. In particular at the border of the radio access network RAN a slave base station can be surrounded by less than four neighbor slave base stations and less than two master base stations.

According to the first slave base station SBS1, the two radio cells belonging to the first and the second master base station MBS1 and MBS2 are located at opposite sites of the radio cell of the first slave base station SBS1.

By using such an arrangement of three collaborative MIMO domains CMD1, CMD2, and CMD3 and repeatedly placing it throughout the radio access network RAN all radio cells of the radio access network RAN are allocated to one of the three collaborative MIMO domains CMD1, CMD2, and CMD3.

All downlink frames used in the radio access network RAN with three different collaborative MIMO domains CMD1, CMD2, and CMD3 are split in the first part P1 for the first collaborative MIMO domain CMD1, the second part P2 for the second collaborative MIMO domain CMD2, and a third part P3 for the third collaborative MIMO domain CMD3.

If a mobile station is located at a first location LOC1 the first downlink frame DF1 of the first slave base station SBS1 comprises the two parts P1 and P2 according to the first and the second master base station MBS1 and MBS2.

If a mobile station is located at a second location LOC2 a fourth downlink frame of the fifth slave base station SBS5 comprises the two parts P2 and P3 according to the second and the third master base station MBS2 and MBS3.

If a mobile station is located at a second location LOC3 a fifth downlink frame of the second slave base station SBS2 comprises the two parts P1 and P3 according to the first and the third master base station MBS1 and MBS3.

If a mobile station is located at a fourth location LOC4 a sixth downlink frame of the fourth slave base station SBS4 comprises the two parts P2 and P3 according to the second master base station MBS2 and a fourth master base station MBS4. This is equal to the fourth downlink frame for the second location LOC2.

The third master base station MBS3 and the fourth master base station MBS4 both controlling the third part P3 in different groups of base stations according to the third collaborative MIMO domain CMD3 can control the third part P3 in a uniform manner. This means that the third part P3 is given by the same parameters for e.g. position, size, and form within a downlink frame. It is also possible, that the third part P3 controlled by the third master base station MBS3 and the fourth master base station MBS4 control the third part P3 in a different manner but both with the requirement that the third part P3 must be disjoined to the second part P2 being controlled by the second master base station MBS2.

Residual resources of the resource allocation domain, not used by the parts P1, P2, and P3 can be used for mobile stations, which do not use a collaborative MIMO transmission, e.g. for mobile stations located near a base station.

The invention can be used for any radio cell grid arrangement and is not restricted to the use of three collaborative MIMO domains CMD1, CMD2, and CMD3 and their repeated allocation to groups of base stations. This means for example that it is also possible that a slave base station can have more than two neighbor radio cells belonging to different master base stations or the radio access network RAN is split into four or more repeatedly allocated collaborative MIMO domains. This means also that a downlink frame can be split into more than three parts.

The invention claimed is:

1. A method for use in a radio communication system, said radio communication system comprising at least three base stations, a first one of said at least three base stations hereinafter called first slave base station, a second one of said at least three base stations hereinafter called first master base station, and a third one of said at least three base stations hereinafter called second master base station, said method comprising:
    controlling a first part of a radio resource allocation domain at said first slave base station by said first master base station, wherein controlling said first part of said radio resource allocation domain by said first master base station includes allocating at least one first time period in a downlink frame of said first slave base station for said first slave base station to communicate with at least one associated mobile station,
    wherein said method further comprises:
    controlling at least a second part of said radio resource allocation domain at said first slave base station by said second master base station, wherein controlling said second part of said radio resource allocation domain by said second master base station includes allocating at least one second time period in said downlink frame of said first slave base station for said first slave base station to communicate with said at least one associated mobile station and wherein said first part and said at least second part of said radio resource allocation domain are actively controlled to be disjoined.

2. The method according to claim 1, wherein said radio communication system is an OFDMA radio communication system.

3. The method according to claim 1, said method further comprises:
    changing a first size and a first location of one of said parts at predefined time intervals.

4. The method according to claim 3, wherein said radio communication system further comprises an operation and maintenance centre, said method further comprises:
    determining said first size and said first location of said part by said operation and maintenance centre,
    and transmitting said first size and said first location of said part from said operation and maintenance centre to the corresponding master base station.

5. The method according to claim 3, wherein said method further comprises: coordinating said first size and said first location of said first part and a second size and a second location of said at least second part between said first master base station and said second master base station.

6. The method according to claim 1, wherein said radio communication system further comprises at least one mobile station, a first downlink frame comprises said radio resource allocation domain with said first part and said at least second part, said method further comprises:
    receiving downlink data at one of said master base stations,
    determining a frame layout for said downlink data mapping into one of said parts at said one of said master base stations,
    transmitting said frame layout from said one of said master base stations to said first slave base station, receiving said downlink data at said slave base station, scheduling said downlink data to one of said parts of a first downlink frame according to said frame layout at said first slave base station, and transmitting said first downlink frame from said first slave base station to said at least one mobile station.

7. The method according to claim 6, wherein said method is used for a hard handover from said one of said master base stations to said first slave base station.

8. The method according to claim 6, wherein said frame layout is a subpart of said part and said method further comprises: controlling radio resources of said part outside said frame layout by said first slave base station.

9. The method according to claim 6, wherein said radio communication system further comprises at least a second slave base station, wherein said frame layout is transmitted from said one of said master base stations by a multicast transmission to said first slave base station and to said at least second slave base station.

10. The method according to claim 6, wherein said method is used for a multicast transmission from at least two base stations to said at least one mobile station, and wherein said method further comprises:

scheduling said downlink data to one of said parts of a second downlink frame according to said frame layout at said one of said master base stations, and transmitting said second downlink frame from said one of said master base stations to said at least one mobile station, wherein said part is located in identical regions of said first downlink frame and said second downlink frame and wherein said first downlink frame and said second downlink frame are transmitted synchronized at a predefined time.

11. The method according to claim 10, wherein at least one of said master base stations and said first slave base station transmit to said at least one mobile station in a collaborative MIMO mode or a collaborative MISO mode.

12. A radio communication system comprising at least three base stations, a first one of said at least three base stations hereinafter called first slave base station, a second one of said at least three base stations hereinafter called first master base station, and a third one of said at least three base stations hereinafter called second master base station, said radio communication system comprising:

a processor for controlling a first part of a radio resource allocation domain at said first slave base station by said first master base station, wherein controlling said first part of said radio resource allocation domain by said first master base station includes allocating at least one first time period in a downlink frame of said first slave base station for said first slave base station to communicate with at least one associated mobile station and wherein said radio communication system further comprises:

at least one processor for controlling at least a second part of said radio resource allocation domain at said first slave base station by said second master base station, wherein controlling said second part of said radio resource allocation domain by said second master base station includes allocating at least one second time period in said downlink frame of said first slave base station for said first slave base station to communicate with said at least one associated mobile station, and wherein said first part and said at least second part of said radio resource allocation domain are actively controlled by said first and second master base stations to be disjoined.

13. The radio communication system according to claim 12, wherein a first radio cell of said first slave base station adjoins a second radio cell of said first master base station and a third radio cell of said second master base station.

14. The radio communication system according to claim 13, said radio communication system comprising:

a receiver for receiving downlink data at one of said master base stations, a processor for determining a frame layout for said downlink data mapping into one of said parts at said one of said master base stations, and a transmitter for transmitting said frame layout via a fibre based or wire based connection from said one of said master base stations to said first slave base station.

15. A base station, said base station comprising:

a processor configured to generate a message for controlling a first part of a radio resource allocation domain of an associated third base station for communicating with at least one associated mobile station to be disjoined from a second part of said radio resource allocation domain of said associated third base station for communicating with the at least one associated mobile station, the controlling being based on parameters agreed upon between said base station and an associated second base station or based on parameters received from an associated network element having control functions and coordinating activities of said base station and said associated second base station, said message describing a frame layout of said first part of said radio resource allocation domain; and a transmitter that is operative to transmit said message to said associated third base station, thereby actively controlling said first part of said radio resource allocation domain at said third base station to be disjoined from the second part of said radio resource allocation domain, wherein controlling said first part of said radio resource allocation domain includes allocating at least one time period in a downlink frame of said associated third base station for said associated third base station to communicate with the at least one associated mobile station.

16. The base station of claim 15 further comprising:

a receiver that is operative to receive a request for coordinating said first part and at least said second part of said radio resource allocation domain that is to be controlled by at least said second base station from at least said second base station, said processor being configured for processing said request according to a requirement that said first part and said at least second part of said radio resource allocation domain are disjoined, and a transmitter for transmitting a result of said processing.

17. The base station of claim 15 further comprising:

a transmitter that is operative to transmit a request for coordinating said first part and at least said second part of said radio resource allocation domain that is to be controlled by at least said second base station to at least said second base station, and a receiver for receiving a result of said request.

* * * * *